US012673644B2

(12) United States Patent (10) Patent No.: US 12,673,644 B2
Miyake et al. (45) Date of Patent: Jul. 7, 2026

(54) BRAKE CONTROL DEVICE, VEHICLE, AND STORAGE MEDIUM

(71) Applicants: TOYOTA JIDOSHA KABUSHIKI KAISHA, Toyota (JP); J-QUAD DYNAMICS INC., Tokyo (JP); ADVICS CO., LTD., Kariya (JP)

(72) Inventors: Kazuki Miyake, Okazaki (JP); Yuta Ohashi, Toyota (JP); Yusuke Kamiya, Toyota (JP); Sotaro Muramatsu, Tokyo (JP)

(73) Assignees: TOYOTA JIDOSHA KABUSHIKI KAISHA, Toyota (JP); J-QUAD DYNAMICS INC., Tokyo (JP); ADVICS CO., LTD., Kariya (JP)

( * ) Notice: Subject to any disclaimer, the term of this patent is extended or adjusted under 35 U.S.C. 154(b) by 177 days.

(21) Appl. No.: 18/588,496

(22) Filed: Feb. 27, 2024

(65) Prior Publication Data

US 2024/0300459 A1 Sep. 12, 2024

(30) Foreign Application Priority Data

Mar. 6, 2023 (JP) ................................ 2023-033618

(51) Int. Cl.
  *B60T 7/22* (2006.01)
  *B60T 8/171* (2006.01)
  *B60T 8/172* (2006.01)
(52) U.S. Cl.
  CPC ................ *B60T 7/22* (2013.01); *B60T 8/171* (2013.01); *B60T 8/172* (2013.01); *B60T*

*2201/024* (2013.01); *B60T 2201/03* (2013.01); *B60T 2220/04* (2013.01)

(58) Field of Classification Search
  CPC . B60T 7/22; B60T 8/171; B60T 8/172; B60T 2201/024; B60T 2201/03; B60T 2220/04; B60T 7/042; B60T 13/662; B60T 8/17
  See application file for complete search history.

(56) References Cited

U.S. PATENT DOCUMENTS

| | | | | |
|---|---|---|---|---|
| 2005/0269876 A1* | 12/2005 | Higuchi | .................... | B60T 7/12 |
| | | | | 303/155 |
| 2008/0243323 A1* | 10/2008 | Karnjate | ................ | B60T 7/042 |
| | | | | 701/22 |
| 2017/0297547 A1* | 10/2017 | Goto | ......................... | B60T 8/00 |
| 2018/0319397 A1* | 11/2018 | Ohta | ................... | B60W 30/143 |
| 2018/0326852 A1* | 11/2018 | Shiozawa | ........... | B60W 40/076 |

(Continued)

FOREIGN PATENT DOCUMENTS

JP 2022-066726 A 5/2022

*Primary Examiner* — Kurt Philip Liethen
(74) *Attorney, Agent, or Firm* — Oliff PLC

(57) ABSTRACT

A brake control device includes a processor that controls a brake device of a vehicle. The processor receives a first braking request indicating first braking force by the brake device which is requested from an application that implements a driver assistance function of the vehicle. The processor receives a second braking request indicating second braking force by the brake device which is requested depending on an operation amount of a brake pedal of the vehicle. The processor starts override control when the processor receives the second braking request while the processor controls the brake device in accordance with the first braking request.

10 Claims, 4 Drawing Sheets

(56)　　　　　　References Cited

U.S. PATENT DOCUMENTS

2020/0017082　A1 *　1/2020　Takahashi ............. B60T 13/586
2020/0070802　A1 *　3/2020　Yamada ................ B60W 10/04
2022/0118957　A1　　4/2022　Miyake et al.

* cited by examiner

BRAKE CONTROL DEVICE, VEHICLE, AND STORAGE MEDIUM

CROSS-REFERENCE TO RELATED APPLICATION

This application claims priority to Japanese Patent Application No. 2023-033618 filed on Mar. 6, 2023, incorporated herein by reference in its entirety.

BACKGROUND

1. Technical Field

The present disclosure relates to a brake control device, a vehicle, and a storage medium.

2. Description of Related Art

Japanese Unexamined Patent Application Publication No. 2022-66726 (JP 2022-66726 A) describes a brake control device that controls a brake device of a vehicle. The brake control device receives a first braking request indicating braking force requested from an application that implements a driver assistance function of the vehicle. Also, the brake control device receives a second braking request indicating braking force depending on an operation amount of a brake pedal of the vehicle. Then, when the brake control device receives the second braking request while controlling the brake in accordance with the first braking request, the brake control device controls the brake to generate braking force larger than the first braking request.

As mentioned above, when the brake control device described in JP 2022-66726 A receives the second braking request while controlling the brake in accordance with the first braking request, the brake control device generates the braking force larger than the first braking request at that time. However, in the brake control device described in JP 2022-66726 A, changes in a value of the first braking request, after reception of the second braking request and until end of the operation of the brake pedal, are not taken into consideration. Therefore, there is room for further study on how to reflect the changes in the value of the first braking request on the braking force, in a situation where the braking force is increasing in response to the reception of the second braking request.

SUMMARY

According to one aspect of the present disclosure, a brake control device includes one or more processors configured to control a brake device of a vehicle. The one or more processors are configured to: receive a first braking request indicating first braking force by the brake device which is requested from an application that implements a driver assistance function of the vehicle; receive a second braking request indicating second braking force by the brake device which is requested depending on an operation amount of a brake pedal of the vehicle; and start override control, when the one or more processors receive the second braking request while the one or more processors controls the brake device in accordance with the first braking request. The override control includes setting, as requested braking force for the brake device, a larger one between the first braking force at present and a sum of the second braking force at the present and the first braking force at a time when the override control is started.

According to the above configuration, when the first braking force becomes larger than the sum of the second braking force and the first braking force at the time when the override control is started, the processor controls the brake device by setting the first braking force as the requested braking force. Therefore, even when the first braking force increases during the override control, the brake control device can control the brake device in accordance with the changed first braking force.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a schematic diagram showing a control system of a vehicle;

DETAILED DESCRIPTION OF EMBODIMENTS

Embodiment

Figure 2:
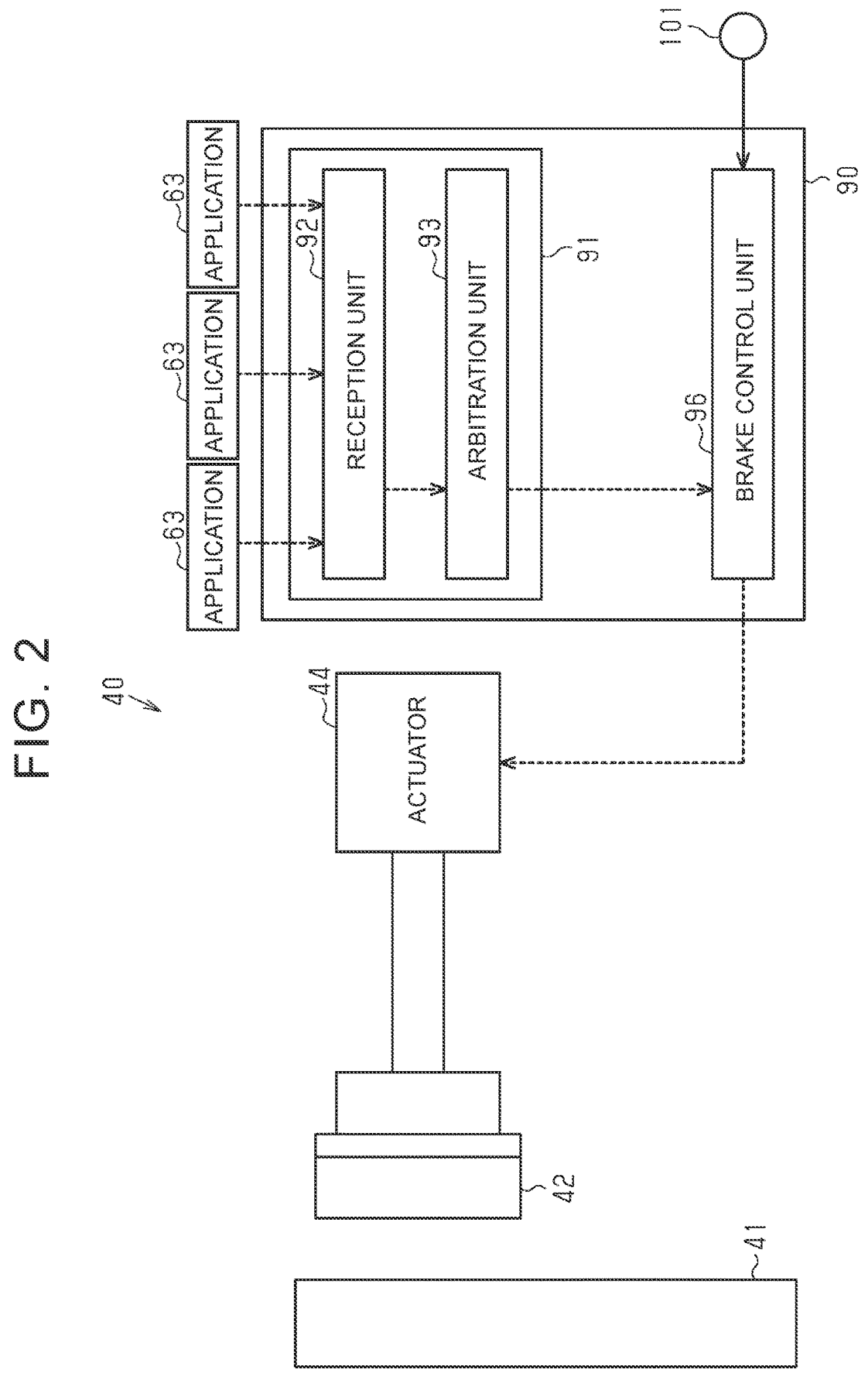
FIG. 2 is a schematic diagram showing a brake control device.

An embodiment of a brake control device, a vehicle, and a storage medium will be described below. The brake control device will be described below with reference to the drawings.

Outline of Vehicle

Figure 1:
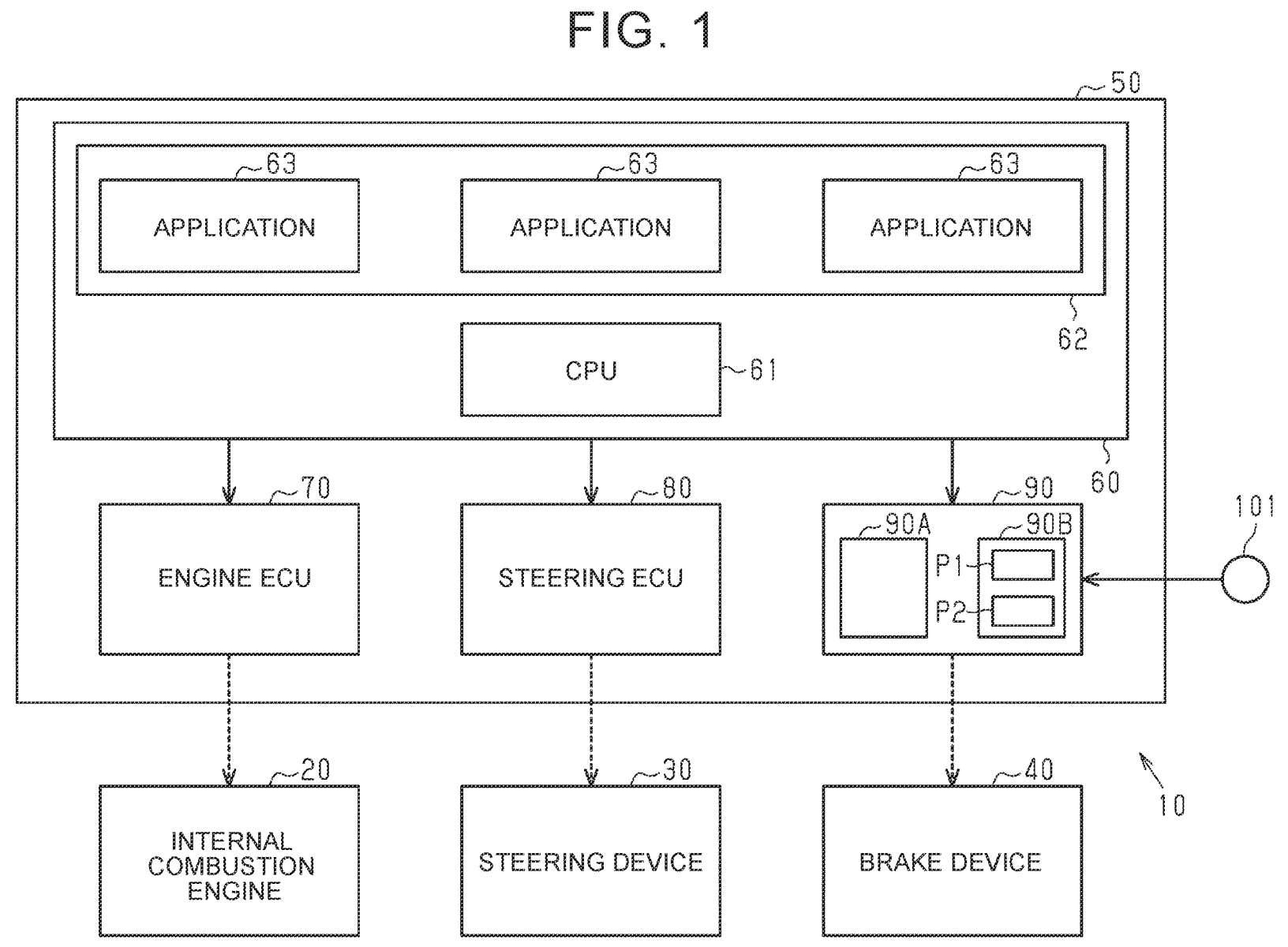

As shown in FIG. 1, a vehicle 10 includes an internal combustion engine 20, a steering device 30, a brake device 40, and a control device 50.

The internal combustion engine 20 is a drive source of the vehicle 10. Although not shown, the internal combustion engine 20 includes a plurality of actuators such as a throttle valve, a fuel injection valve, and an ignition device. The control device 50 controls each actuator described above. Accordingly, the internal combustion engine 20 burns fuel and generates driving force of the vehicle 10.

The steering device 30 changes a steering angle of a steering wheel of the vehicle 10. The steering device 30 includes an electric power steering. The control device 50 controls the actuator of the electric power steering. Accordingly, the electric power steering assists a steering operation by a driver. Further, the electric power steering performs a fine adjustment of the steering operation amount by the driver or performs an adjustment of the steering angle without the operation by the driver, by the actuator of the electric power steering being controlled by the control device 50.

The brake device 40 is provided in each wheel of the vehicle 10. The brake device 40 is a disk brake that uses hydraulic pressure to generate braking force. As shown in FIG. 2, the brake device 40 includes a disk 41, a brake pad 42, and an actuator 44 that applies the hydraulic pressure to the brake pad 42. That is, the actuator 44 outputs the hydraulic pressure. The disk 41 is a rotating body that rotates integrally with the wheel of the vehicle 10. The brake pad 42 is a friction material supported by a vehicle body of the vehicle 10. The hydraulic pressure from the actuator 44 is controlled by the control device 50. The brake device 40 generates the braking force in the vehicle 10 by bringing the disk 41 and the brake pad 42 into contact with each other.

As shown in FIG. 1, the control device 50 includes an advanced safety electronic control unit (ECU) 60, an engine ECU 70, a steering ECU 80, and a brake ECU 90. The ECUs can transmit and receive signals with each other via an internal bus (not shown).

The advanced safety ECU 60 implements functions related to a driver assistance of the vehicle 10. Specifically, the advanced safety ECU 60 includes a central processing unit (CPU) 61 and a read only memory (ROM) 62. The ROM 62 stores a plurality of applications 63.

Each application 63 is a program that implements functions of an advanced driver assistance system. An example of the applications 63 is an adaptive cruise control (ACC) application for follow-up traveling while maintaining a constant inter-vehicle distance from a preceding vehicle. The ACC application requests each actuator mounted on the vehicle 10 to accelerate and decelerate, so that the vehicle 10 can travel while maintaining a constant distance from the preceding vehicle.

Further, another example of the applications 63 is an auto speed limiter (ASL) application that recognizes a vehicle speed limit and maintains the speed of the vehicle 10 at or below the vehicle speed limit. Furthermore, another example of the applications 63 is a collision damage reducing brake application that automatically brakes the vehicle 10 to reduce the damage of a collision, that is, a so-called autonomous emergency braking (AEB) application. In addition, another example of the applications 63 is a lane keeping assist (LKA) application that maintains the lane in which the vehicle 10 is traveling.

The CPU 61 acquires a plurality of detection values from a plurality of sensors (not shown) mounted on the vehicle 10. The CPU 61 uses the detection values from the sensors to execute each application 63 that is stored in the ROM 62. When the CPU 61 executes each application 63, the CPU 61 outputs a motion request corresponding to the application 63, so that the functions of each application 63 can be implemented. Note that the CPU 61 may also execute the applications 63 at the same time. In this case, the CPU 61 outputs an individual motion request for each executed application 63.

The CPU 61 outputs each motion request to the ECU that includes a control unit of the actuator that needs to be controlled in order to implement the functions of each application 63. Specifically, the CPU 61 outputs the motion request to one or more ECUs selected from the engine ECU 70, the steering ECU 80, and the brake ECU 90.

The engine ECU 70 is a computer that includes a CPU and a ROM (not shown). The CPU of the engine ECU 70 controls the internal combustion engine 20 by executing a program that is stored in the ROM. That is, the engine ECU 70 is a control device that controls the internal combustion engine 20. In particular, the engine ECU 70 controls the internal combustion engine 20 based on the motion request from the advanced safety ECU 60.

The steering ECU 80 is a computer that includes a CPU and a ROM (not shown). The CPU of the steering ECU 80 controls the steering device 30 by executing a program that is stored in the ROM. That is, the steering ECU 80 is a control device that controls the steering device 30. In particular, the steering ECU 80 controls the steering device 30 based on the motion request from the advanced safety ECU 60.

The brake ECU 90 is a computer that includes a CPU and a ROM (not shown). The CPU of the brake ECU 90 controls the brake device 40 by executing a program that is stored in the ROM. That is, the brake ECU 90 is a brake control device that controls the brake device 40. In particular, the brake ECU 90 controls the brake device 40 based on the motion request from the advanced safety ECU 60. The operation of the brake ECU 90 is described below in detail.

Also, the vehicle 10 includes a brake pedal sensor 101 that detects an operation amount of a brake pedal. The brake pedal sensor 101 outputs a signal indicating the braking force requested to the brake device 40 depending on the operation amount of the brake pedal, to the brake ECU 90. Brake ECU As shown in FIG. 2, the brake ECU 90 functions as a motion manager 91 and a brake control unit 96. Specifically, as shown in FIG. 1, the brake ECU 90 includes an execution device 90A and a storage device 90B. The execution device 90A is a CPU. The execution device 90A can execute various programs stored in the storage device 90B. The storage device 90B is a ROM and a random access memory (RAM). The storage device 90B stores a motion manager program P1 for the motion manager 91. The execution device 90A implements a function as the motion manager 91 by executing the motion manager program P1.

Also, the storage device 90B stores a brake control program P2 for brake control. The execution device 90A implements a function as the brake control unit 96 by executing the brake control program P2. The brake control program P2 is a program applied to a computer that controls the brake device 40.

Note that, below, the brake ECU 90 when functioning as the motion manager 91 is simply referred to as the motion manager 91. Similarly, the brake ECU 90 when functioning as the brake control unit 96 is simply referred to as the brake control unit 96.

As shown in FIG. 2, the motion manager 91 functions as a reception unit 92 and an arbitration unit 93. The motion manager 91 starts managing the motion request when the motion request is input from the advanced safety ECU 60 in order to implement the functions of the advanced driver assistance system. When the motion manager 91 starts managing the motion request, the motion manager 91 first performs a reception process. The reception unit 92 performs a process in the reception process.

The reception unit 92 can receive a requested acceleration from the advanced safety ECU 60 as the motion request corresponding to each application 63. When the requested acceleration indicated by the motion request is a negative value, the motion request indicates the braking force requested to the brake device 40. When the requested acceleration is a small negative value, the braking force is in a large state. In addition, as described above, the advanced safety ECU 60 may also execute the applications 63 at the same time. In this case, the reception unit 92 receives a plurality of motion requests and outputs the motion requests to the arbitration unit 93.

Then, the motion manager 91 advances the process to an arbitration process.

The arbitration unit 93 performs a process in the arbitration process.

The arbitration unit 93 arbitrates the motion request received by the reception unit 92. When there is only one motion request that is received by the reception unit 92, the arbitration unit 93 selects the motion request. On the other hand, when there are multiple motion requests received by the reception unit 92, the arbitration unit 93 arbitrates the motion requests based on a predetermined selection criterion. For example, the arbitration unit 93 selects one motion request from among the received motion requests, or selects an allowable range of control based on the received motion requests. Thereafter, the brake ECU 90 outputs an arbitration result of the arbitration unit 93 to the brake control unit 96, as a first braking request. That is, the first braking request indicates the braking force by a brake that is requested from the application 63 that implements the driver assistance function of the vehicle 10.

The brake control unit 96 can receive the first braking request indicating the braking force by the brake device 40 that is requested from the application 63, via the motion manager 91. Further, the brake control unit 96 can receive the second braking request indicating the braking force requested to the brake device 40 depending on the operation amount of the brake pedal, from the brake pedal sensor 101.

The brake control unit 96 generates a control value to be output to the brake device 40 based on the received first braking request and second braking request. Then, the brake control unit 96 outputs the generated control value to the actuator 44 of the brake device 40. As a result, the brake control unit 96 controls the brake device 40 by driving the actuator 44.

Specifically, when receiving only the first braking request, the brake control unit 96 outputs a control value that implements first braking force F1 that is the braking force indicated by the first braking request, to the actuator 44. On the other hand, when receiving only the second braking request, the brake control unit 96 outputs a control value that implements second braking force F2 that is the braking force indicated by the second braking request, to the actuator 44.

Override Control

The brake control unit 96 starts override control when the second braking request is received while controlling the brake device 40 in accordance with the first braking request. In the present embodiment, the brake control unit 96 repeatedly calculates additional requested braking force FA during the override control. Then, the brake control unit 96 calculates requested braking force FD requested to the brake device 40 by adding the second braking force F2 to the additional requested braking force FA. Further, the brake control unit 96 sets the requested braking force FD requested to the brake device 40 to the first braking force F1 depending on the situation. Then, the brake control unit 96 outputs a control value that implements the calculated requested braking force FD to the actuator 44.

Hereinafter, a specific process procedure for the override control by the brake control unit 96 will be described.

Figure 3:
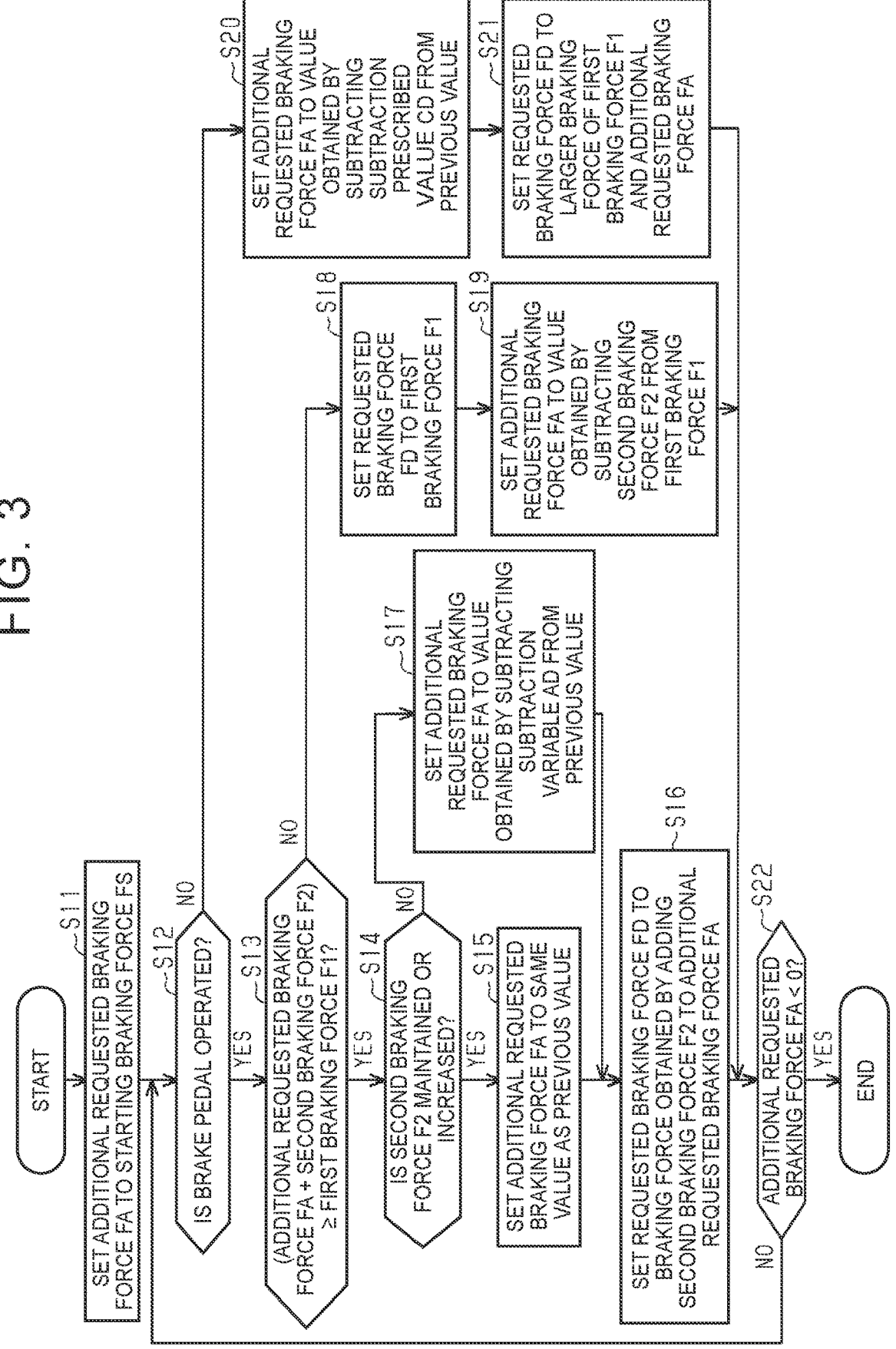
FIG. 3 is a flowchart showing a series of process by override control.

As shown in FIG. 3, when the brake control unit 96 starts the override control, the process of step S11 is performed firstly. In step S11, the brake control unit 96 sets the additional requested braking force FA to starting braking force FS. The starting braking force FS is the first braking force F1 when the override control is started. After that, the brake control unit 96 advances the process to step S12.

In step S12, the brake control unit 96 determines whether the brake pedal is operated. Specifically, the brake control unit 96 determines whether the second braking request is received continuously. The brake control unit 96 determines that the brake pedal is operated when the second braking request is received continuously. On the other hand, when the second braking request is no longer received, the brake control unit 96 determines that the brake pedal is not operated, that is, the brake pedal is not depressed. When the brake pedal is operated (S12: YES), the brake control unit 96 advances the process to step S13.

In step S13, the brake control unit 96 determines whether the braking force obtained by adding the second braking force F2 to the additional requested braking force FA, is equal to or larger than the first braking force F1. When the braking force obtained by adding the second braking force F2 to the additional requested braking force FA is equal to or larger than the first braking force F1 (S13: YES), the brake control unit 96 advances the process to step S14.

In step S14, the brake control unit 96 determines whether the second braking force F2 is maintained or increased. Specifically, the brake control unit 96 compares the second braking force F2 indicated by the second braking request received previous time with the second braking force F2 indicated by the second braking request received current time. When a value of the current second braking force F2 is equal to or larger than a value of the previous second braking force F2, the brake control unit 96 determines that the second braking force F2 is maintained or increased. On the other hand, when the value of the current second braking force F2 is smaller than the value of the previous second braking force F2, the brake control unit 96 determines that the second braking force F2 is decreased. When the second braking force F2 is maintained or increased (S14: YES), the brake control unit 96 advances the process to step S15.

In step S15, the brake control unit 96 sets the additional requested braking force FA to the same value as the previous value. After that, the brake control unit 96 advances the process to step S16.

In step S16, the brake control unit 96 controls the brake device 40 by setting the requested braking force FD to the braking force obtained by adding the second braking force F2 to the additional requested braking force FA. Thus, when the process of step S16 is performed after passing through step S15, the additional requested braking force FA is maintained at the previous value. Therefore, when the second braking force F2 is maintained or increased, the brake control unit 96 calculates the requested braking force FD as the braking force that is larger than the additional requested braking force FA that is the braking force when the second braking force F2 started to increase, and that reflects the increase in the second braking force F2.

On the other hand, when the second braking force F2 is decreased (S14: NO), the brake control unit 96 advances the process to step S17. In step S17, the brake control unit 96 sets the additional requested braking force FA to a value obtained by subtracting a subtraction variable AD from the previous value. The subtraction variable AD is equal to a decrease amount in the second braking force F2 per unit time. Note that the unit time here is a control cycle of the override control. Therefore, in step S17, the faster the second braking force F2 decreases, the smaller the additional requested braking force FA is set than the previous value by the brake control unit 96. After that, the brake control unit 96 advances the process to step S16. Thus, when the process of step S16 is performed after passing through step S15, the brake control unit 96 calculates the requested braking force FD that is smaller than the previous value in accordance with the decrease in the second braking force F2.

By the way, when the braking force obtained by adding the second braking force F2 to the additional requested braking force FA is smaller than the first braking force F1 (S13: NO), the brake control unit 96 advances the process to step S18.

In step S18, the brake control unit 96 calculates the first braking force F1 as the requested braking force FD. Therefore, when the first braking force F1 corresponding to the first motion request from the application 63 is relatively large, the brake control unit 96 performs control such that the first braking force F1 is implemented, regardless of the operation amount of the brake pedal. After that, the brake control unit 96 advances the process to step S19.

In step S19, the brake control unit 96 sets the additional requested braking force FA to a value obtained by subtracting the second braking force F2 from the first braking force F1 that is the requested braking force FD.

Now, when the brake pedal is no longer operated (S12: NO), the brake control unit 96 advances the process to step S20. In step S20, the brake control unit 96 sets the additional requested braking force FA to a value obtained by subtracting a predetermined subtraction prescribed value CD from the previous value. Therefore, after the brake pedal is no longer operated, the additional requested braking force FA decreases by a constant amount. After that, the brake control unit 96 advances the process to step S21.

In step S21, the larger of the first braking force F1 and the additional requested braking force FA is calculated as the requested braking force FD. As described above, the additional requested braking force FA gradually decreases. Therefore, the brake control unit 96 performs control in accordance with the first braking force F1 at some timing after the brake pedal is no longer operated.

The brake control unit 96 advances the process to step S22 after performing any one of processes of step S16, step S19, and step S21. In step S22, the brake control unit 96 determines whether the additional requested braking force FA has become smaller than zero. When the additional requested braking force FA is equal to or larger than zero (S22: NO), the brake control unit 96 determines that the current override control is continued. Thereby, the brake control unit 96 returns the process to step S12. On the other hand, when the additional requested braking force FA becomes smaller than zero (S22: YES), the brake control unit 96 ends a series of processes of the current override control.

Operations of Embodiment

Figure 4:
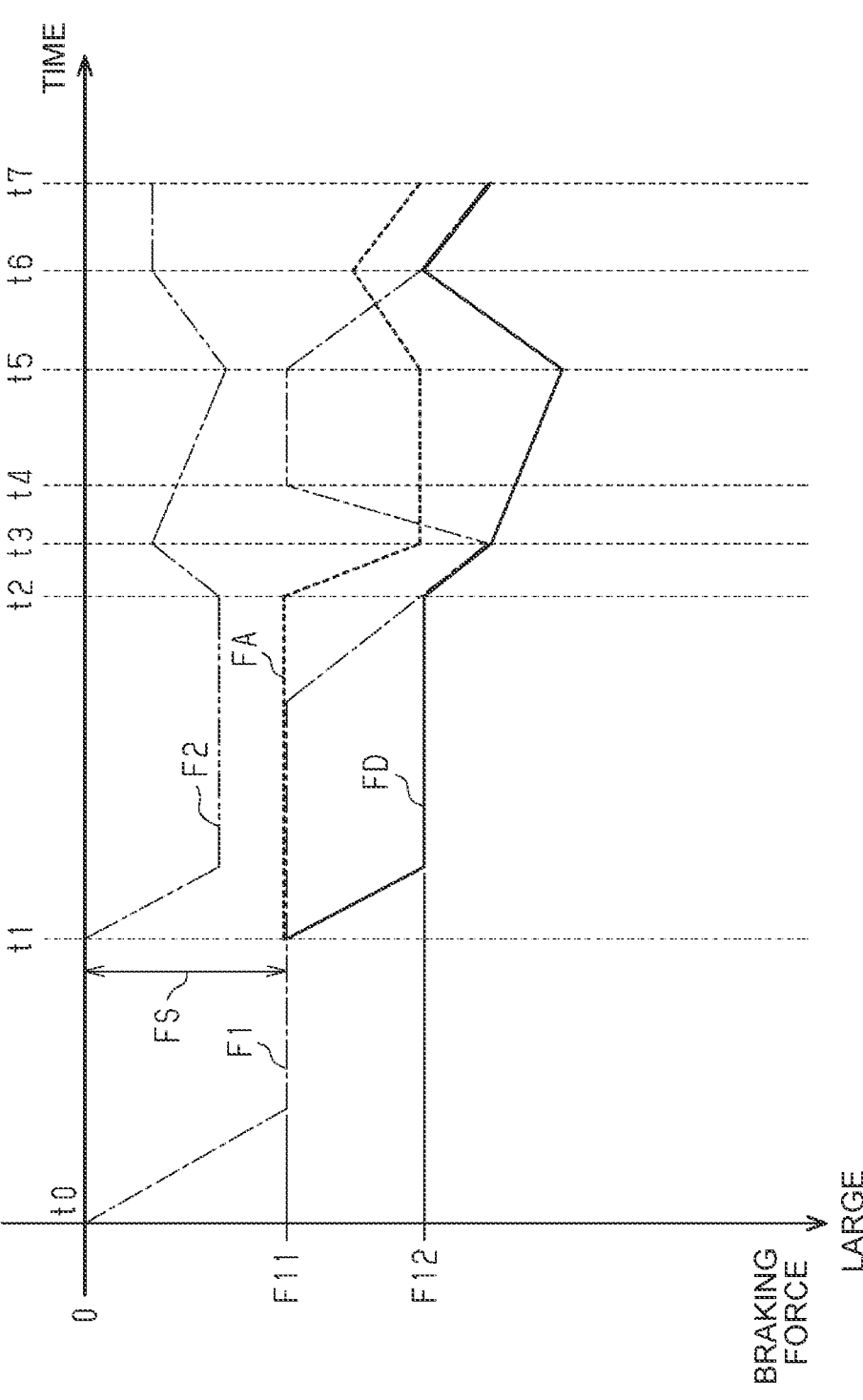
FIG. 4 is a timing chart showing each braking force.

As shown in FIG. 4, assume that the brake control unit 96 receives the first braking request at time t0. At this time, the brake control unit 96 has not received the second braking request. Therefore, the brake control unit 96 calculates the first braking force F1 indicated by the first braking request, as the requested braking force FD. Note that, in FIG. 4, the first braking force F1 is shown by a long dashed short dashed line, the second braking force F2 is shown by a long dashed double-short dashed line, the additional requested braking force FA is shown by a chain line, and the requested braking force FD is shown by a bold line. Further, since the requested braking force FD from time t0 to time t1 is the same as the first braking force F1, only the first braking force F1 is illustrated as a representative.

Assume that the brake control unit 96 receives the second braking request at time t1 after time t0. At this time, since the brake control unit 96 has already received the first braking request, the brake control unit 96 starts the override control. When the brake control unit 96 starts the override control, the brake control unit 96 sets the additional requested braking force FA to braking force F11 of the first braking force F1 at time t1. After starting braking force time t1, the brake control unit 96 compares the first braking force F1 with the braking force obtained by adding the second braking force F2 to the braking force F11 that is the additional requested braking force FA.

After time t1, the second braking force F2 is assumed to be constant until time t2 that is after time t1. At this time, the brake control unit 96 continues to set the additional requested braking force FA to the previous value.

Further, assume that the first braking force F1 gradually increases after time t1. Then, at time t2, assume that the first braking force F1 becomes larger than the braking force obtained by adding the second braking force F2 to the braking force F11 that is the additional requested braking force FA. At this time, the brake control unit 96 sets the additional requested braking force FA to a value obtained by subtracting the second braking force F2 from the first braking force F1. Then, the brake control unit 96 calculates the requested braking force FD as the first braking force F1.

After time t2, the first braking force F1 is assumed to increase continuously until time t3 that is after time t2. At this time, the brake control unit 96 sets the additional requested braking force FA to a value obtained by subtracting the second braking force F2 from the increased first braking force F1. Note that the second braking force F2 is assumed to decrease continuously from time t2 to time t3. Therefore, the brake control unit 96 reflects the increase in the first braking force F1 and the decrease in the second braking force F2 on the updated additional requested braking force FA.

After time t3, the first braking force F1 is assumed to decrease continuously until time t4 that is after time t3. Further, after time t4, the first braking force F1 is assumed to be maintained until time t5 that is after time t4. After time t3, the second braking force F2 is assumed to increase continuously until time t5. At time t3, the brake control unit 96 sets the additional requested braking force FA to a value obtained by subtracting the second braking force F2 from braking force F12 that is the first braking force F1 at time t3. After time t3 and until time t5, the brake control unit 96 calculates the value obtained by adding the second braking force F2 to the additional requested braking force FA calculated at time t3, as the requested braking force FD. As a result, from time t3 to time t5, the brake control unit 96 does not reflect the decrease in the first braking force F1 on the additional requested braking force FA. On the other hand, from time t3 to time t5, the brake control unit 96 reflects the increase in the second braking force F2 on the requested braking force FD. As a result, the brake control unit 96 implements generation of the braking force obtained by adding the increase in the second braking force F2 in addition to the requested braking force FD when the second braking force F2 started to increase.

After time t5, the second braking force F2 is assumed to decrease continuously until time t6 that is after time t5. Further, after time t6, the second braking force F2 is assumed to be maintained until time t7 that is after time t6. After time t5, the first braking force F1 is assumed to increase continuously until time t7. After time t5, and until time t6, since the second braking force F2 decreases, the brake control unit 96 continues to decrease the additional requested braking force FA in accordance with the subtraction variable AD. As a result, the requested braking force FD calculated by the brake control unit 96 continues to decrease at a rate larger than the rate of decrease of the second braking force F2. Then, at time t6, the first braking force F1 is assumed to exceed the braking force obtained by adding the additional requested braking force FA to the second braking force F2. At this time, the brake control unit 96 sets the additional requested braking force FA to a value obtained by subtracting the second braking force F2 at time t6 from the first braking force F1 at time t6.

As a result, in the present embodiment, the brake control unit 96 starts calculating the additional requested braking force FA when the first braking force F1 exceeds the braking force obtained by adding the second braking force F2 to the additional requested braking force FA. Then, by updating the additional requested braking force FA, the brake control unit 96 can calculate the requested braking force FD with the increased second braking force F2 being reflected thereon, also when the second braking force F2 starts to increase.

Effects of Embodiment (1) According to the above embodiment, in the override control, the brake control unit 96 calculates the larger of the first braking force F1 and the braking force obtained by adding the second braking force F2 to the starting braking force FS, as the requested braking force FD. Therefore, even when the first braking force F1 may increase during the override control, it is possible to implement generation of the requested braking force FD on which the increased first braking force F1 is reflected.

(2) In the above embodiment, during the override control, a period may occur in which the second braking force F2 increases after the first braking force F1 is set as the requested braking force FD. According to the above embodiment, during this period, the brake control unit 96 controls the brake device 40 by setting the braking force that is stronger than the requested braking force FD at the time when the second braking force F2 started to increase, as the requested braking force FD. Therefore, when the driver of the vehicle 10 operates the brake pedal to increase the braking force, the requested braking force FD is calculated as a stronger braking force, even during the override control so as to comply with the driver's intention. Thereby, the brake control can be implemented that reduces discomfort of the driver of the vehicle 10.

(3) In the above embodiment, the brake control unit 96 calculates the additional requested braking force FA during the override control. Then, after the requested braking force FD is set to the first braking force F1, during the period in which the second braking force F2 increases, the additional requested braking force FA is calculated by subtracting the second braking force F2 from the first braking force F1 that is the requested braking force FD. Then, the brake control unit 96 sets the value obtained by adding the second braking force F2 to the additional requested braking force FA, as the requested braking force FD. Thereby, during the period in which the second braking force F2 increases, the brake control unit 96 can implement the calculation such that the requested braking force FD is larger by the amount of the increase in the second braking force F2.

(4) According to the above embodiment, the brake ECU 90 includes the motion manager 91 and the brake control unit 96. The motion manager 91 arbitrates the motion requests requested from the applications 63 and outputs the second braking request to the brake control unit 96. Therefore, the first braking request may change to one based on the motion request from a different application 63. In this case, the first braking force F1 indicated by the first braking request is likely to increase even during the override control. Therefore, considering the changes in the first braking force F1 indicated by the first braking request is highly necessary. As a result, the issue of considering the changes in the first braking force F1 is likely to occur. The above embodiment can easily obtain the effect (1).

Other Embodiments

The above embodiment can be implemented with the following modifications. The above embodiment and the following modifications can be combined with each other within a technically consistent range to be implemented.

The brake ECU 90 may be configured as a circuitry including one or more processors that execute various processes in accordance with a computer program (software). Note that the brake ECU 90 may be configured as a circuitry including one or more dedicated hardware circuitries that execute at least part of the various processes, such as an application specific integrated circuit (ASIC), or a combination thereof. The processor includes a CPU and a memory such as a RAM and a ROM. The memory stores a program code or an instruction configured to make the CPU perform processes. The memory, that is, the computer-readable medium includes any available media that can be accessed by a general purpose or special purpose computer. In this regard, the same applies to other ECUs.

The motion manager 91 of the brake ECU 90 may perform the override control. Also, the brake ECU 90 may not include the motion manager 91. In this case, the brake control unit 96 may receive the first braking request from the applications 63.

The brake control unit 96 may not need to calculate the requested braking force FD by always adding the second braking force F2 to the additional requested braking force FA. For example, when a negative determination is made in step S13, the requested braking force FD may be calculated as the first braking force F1. Also for example, the brake control unit 96 may calculate the additional requested braking force FA only during the period in which the second braking force F2 increases during the override control.

The brake control unit 96 may not need to calculate the additional requested braking force FA. For example, when the brake control unit 96 has not yet set the requested braking force FD to the first braking force F1 and when a positive determination is made in step S13, the brake control unit 96 may set the requested braking force FD to a value obtained by adding the second braking force F2 to the starting braking force FS. Further, after setting the requested braking force FD to the first braking force F1, and when the positive determination is made in step S13, the brake control unit 96 may set the requested braking force FD to a value obtained by adding the second braking force F2 to the requested braking force FD when the positive determination is made in step S13.

After setting the requested braking force FD to the first braking force F1, during the period in which the second braking force F2 increases, the brake control unit 96 may calculate the braking force that is stronger than the requested braking force FD at the time when the second braking force F2 started to increase by more than the increase in the second braking force F2. In addition, during this period, the brake control unit 96 may calculate the braking force that is stronger than the requested braking force FD at the time when the second braking force F2 started to increase, by an amount smaller than the increase in the second braking force F2. Furthermore, after setting the requested braking force FD to the first braking force F1, the brake control unit 96 may control the requested braking force FD in any manner based on the first braking force F1 and the second braking force F2.

What is claimed is:

1. A brake control device comprising one or more processors configured to control a brake device of a vehicle, wherein:

the one or more processors are configured to receive a first braking request indicating a first braking force by the brake device which is requested from an application that implements a driver assistance function of the vehicle,

11 receive a second braking request indicating a second braking force by the brake device which is requested depending on an operation amount of a brake pedal of the vehicle, and start override control, when the one or more processors receive the second braking request while the one or more processors control the brake device in accordance with the first braking request; and the override control includes:

determining a larger one of (i) the first braking force at present and (ii) a sum of the second braking force at present and the first braking force at a time when the override control is started, as an override braking force, and setting the determined override braking force, as a first requested braking force for the brake device.

2. The brake control device according to claim 1, wherein the override control further includes setting a braking force which is larger than the first requested braking force at a time when the second braking force started to increase, as a second requested braking force for the brake device, during a period in which the second braking force increases after the first braking force is set as the first requested braking force.

3. The brake control device according to claim 1, wherein the override control further includes:

in response to setting the first braking force at present as a first requested braking force for brake device, calculating an additional requested braking force by subtracting the second braking force from the first requested braking force; and then setting a value obtained by adding the second braking force to the additional requested braking force, as second requested braking force for the brake device, during a period in which the second braking force increases after the first braking force is set as the first requested braking force.

4. The brake control device according to claim 1, wherein the one or more processors are further configured to arbitrate motion requests requested from applications.

5. The brake control device according to claim 4, wherein:

the one or more processors are configured to function as a motion manager and a control unit;

when the one or more processors function as the motion manager, the one or more processors arbitrate the motion requests requested from the applications, before outputting the first braking request; and when the one or more processors function as the control unit, the one or more processors receive the first braking request and the second braking request, and perform the override control.

12

6. The vehicle comprising:

the brake control device according to claim 1; and the brake device that generates braking force corresponding to the first requested braking force.

7. The brake control device according to claim 1, wherein the one or more processors are configured to repeatedly calculate an additional requested braking force during the override control.

8. The brake control device according to claim 1, wherein the one or more processors are configured to:

in response to setting the sum of the second braking force at the present and the first braking force at the time when the override control is started, as the first requested braking force:

determine whether the second braking force is maintained or increased;

in response to determining that the second braking force is not maintained and not increased, set an additional requested braking force to a value obtained by subtracting a subtraction variable from a previous value of the additional requested braking force; and in response to determining that the second braking force is maintained or increased, set the additional requested braking force to a same value as a previous value.

9. The brake control device according to claim 8, wherein the subtraction variable is equal to a decrease amount in the second braking force per unit time.

10. A non-transitory computer readable storage medium storing instructions that are executable by one or more processors that control a brake device of a vehicle, and that cause the one or more processors to perform functions comprising:

receiving a first braking request indicating a first braking force by the brake device which is requested from an application that implements a driver assistance function of the vehicle;

receiving a second braking request indicating a second braking force by the brake device which is requested depending on an operation amount of a brake pedal of the vehicle; and starting override control, when the second braking request is received while the brake device is controlled in accordance with the first braking request, wherein the override control includes:

determining a larger one of (i) the first braking force at present and (ii) a sum of the second braking force at present and the first braking force at a time when the override control is started, as an override braking force, and setting the determined override braking force, as a requested braking force for the brake device.

* * * * *